(12) United States Patent
Gaskins

(10) Patent No.: US 8,037,672 B2
(45) Date of Patent: Oct. 18, 2011

(54) METHOD AND APPARATUS FOR DETECTING A NON-OPERATIONAL STATUS OF A CATALYST IN AN ENGINE EXHAUST CONDUIT

(75) Inventor: Ronald E. Gaskins, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 1043 days.

(21) Appl. No.: 11/973,519

(22) Filed: Oct. 9, 2007

(65) Prior Publication Data

US 2009/0090097 A1 Apr. 9, 2009

(51) Int. Cl.
*F01N 3/00* (2006.01)
(52) U.S. Cl. ............... 60/277; 60/274; 60/276; 60/286
(58) Field of Classification Search ............... 60/274, 60/276, 277, 286, 299
See application file for complete search history.

(56) References Cited

U.S. PATENT DOCUMENTS

| | | | |
|---|---|---|---|
| 6,263,666 B1 * | 7/2001 | Kubo et al. | 60/277 |
| 6,408,616 B1 * | 6/2002 | Mazur et al. | 60/277 |
| 6,487,852 B1 * | 12/2002 | Murphy et al. | 60/286 |
| 6,523,341 B1 * | 2/2003 | Rumpsa et al. | 60/277 |
| 7,082,752 B2 * | 8/2006 | Plote et al. | 60/277 |
| 7,121,085 B2 * | 10/2006 | van Nieuwstadt | 60/286 |

* cited by examiner

*Primary Examiner* — Thomas E. Denion
*Assistant Examiner* — Diem Tran
(74) *Attorney, Agent, or Firm* — Jimmy L. Funke

(57) ABSTRACT

A quantity of unburned fuel is provided through a combustion chamber of an engine and an exhaust conduit to a catalytic converter. The catalyst in the converter is determined to be non-operational if a post-catalyst temperature sensor does not indicate a sufficient temperature increase between readings before and after provision of the unburned fuel to the combustion chamber. The unburned fuel may be provided by withholding spark ignition to create a misfire in the combustion chamber or, particularly in a direct injection engine, by injecting the fuel during the exhaust stroke.

12 Claims, 6 Drawing Sheets

METHOD AND APPARATUS FOR DETECTING A NON-OPERATIONAL STATUS OF A CATALYST IN AN ENGINE EXHAUST CONDUIT

TECHNICAL FIELD

The technical field of this invention is diagnostics for a catalytic emission control in the exhaust conduit of a combustion engine.

BACKGROUND OF THE INVENTION

In order to reduce undesirable emissions, a combustion engine may be provided with a catalytic converter in its exhaust conduit. The catalytic converter typically includes a substrate having a surface coated with one or more catalysts promoting chemical reactions in which predetermined undesirable combustion products are reduced in quantity. A pre-catalyst oxygen sensor provides an air/fuel ratio indicating signal to the fuel charge apparatus of the engine in a closed loop control to maintain the combustion air/fuel ratio as close to stoichiometric as possible for maximum converter efficiency in reducing undesirable emissions. But the catalytic substances are subject to possible degradation that may reduce, or in some cases destroy, their catalytic effectiveness so that the catalytic converter is not operational.

In order to detect a catalyst sufficiently degraded to be considered non-operational, a prior art method uses a second, post-catalyst oxygen sensor to provide an additional air/fuel ratio signal to the engine control which may be compared to that provided by the pre-catalyst sensor in a known manner to detect a non-operational status of the catalyst. But in engines meant for operating environments with high moisture levels, such as marine or industrial, it is difficult and/or expensive to integrate a post-catalyst oxygen sensor into the exhaust stream because water intrusion leads to oxygen sensor failure. It is an object of this invention to provide a method of detecting a non-operational catalytic converter during engine operation and providing a signal thereof in a manner without using a post-catalyst oxygen sensor.

SUMMARY OF THE INVENTION

The method and apparatus of this invention detects a non-operational status of an engine exhaust catalyst by delivering unburned fuel from at least one combustion chamber of the engine to the catalyst via the engine exhaust conduit and monitoring the temperature of a post-catalyst temperature sensor. An operational catalyst will promote an exothermic reaction when it receives the unburned fuel and increase exhaust gas temperature. If this increase in temperature is not detected by a post-catalyst temperature sensor, a non-operational catalyst is indicated. As a bonus, the signal from the post-catalyst temperature sensor is available to detect a potentially dangerous catalyst temperature from the sensed exhaust gas temperature when the sensor is not being used to test for a non-operational catalyst.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
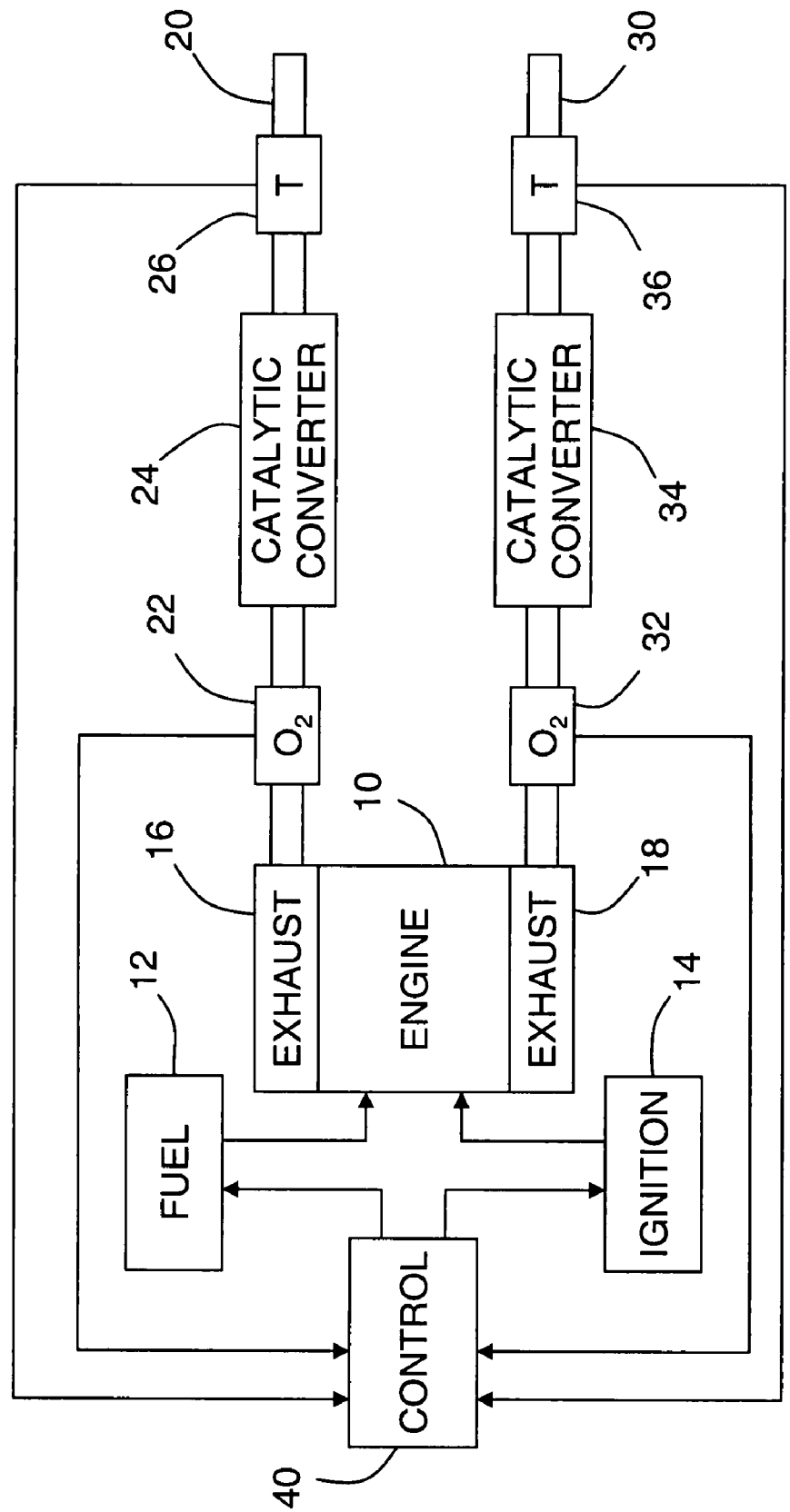
FIG. 1 is a block diagram of a system for detecting a non-operational status of a catalyst in a catalytic converter in an exhaust conduit of a combustion engine according to this invention.

The apparatus of this invention is described with reference to FIG. 1. A combustion engine 10 may be, for example, a spark-ignited internal combustion engine equipped with a fuel charge supply apparatus 12 equipped to mix fuel from a fuel supply 14 with inducted air and deliver a fuel charge to engine 10 for combustion in its internal combustion chambers. An ignition system 14 may be a spark ignition system that ignites the fuel charges within the combustion chambers responsive to a time control system. In this application, an engine "bank" refers to the combustion chambers of an engine sharing a common exhaust conduit including a catalytic converter to be tested. Engine 10 is shown as a multi-bank engine, with two banks each having its own exhaust apparatus. In one of the banks, combustion products are exhausted through an exhaust manifold 16 and an exhaust conduit 20 including a pre-catalyst oxygen sensor 22, a catalytic converter 24, and a post-catalyst temperature sensor 26. Similarly, combustion products from the other bank are exhausted through an exhaust manifold 18 and an exhaust conduit 30 including a pre-catalyst oxygen sensor 32, a catalytic converter 34, and a post-catalyst temperature sensor 36. This invention is not limited to multi-bank engines. It is applicable to engines with any number of combustion chambers in one or more banks, with a separate catalyst for each bank to be tested. It is described with respect to a two bank, dual exhaust engine to provide a basis for describing its many possible variations.

Figure 2:
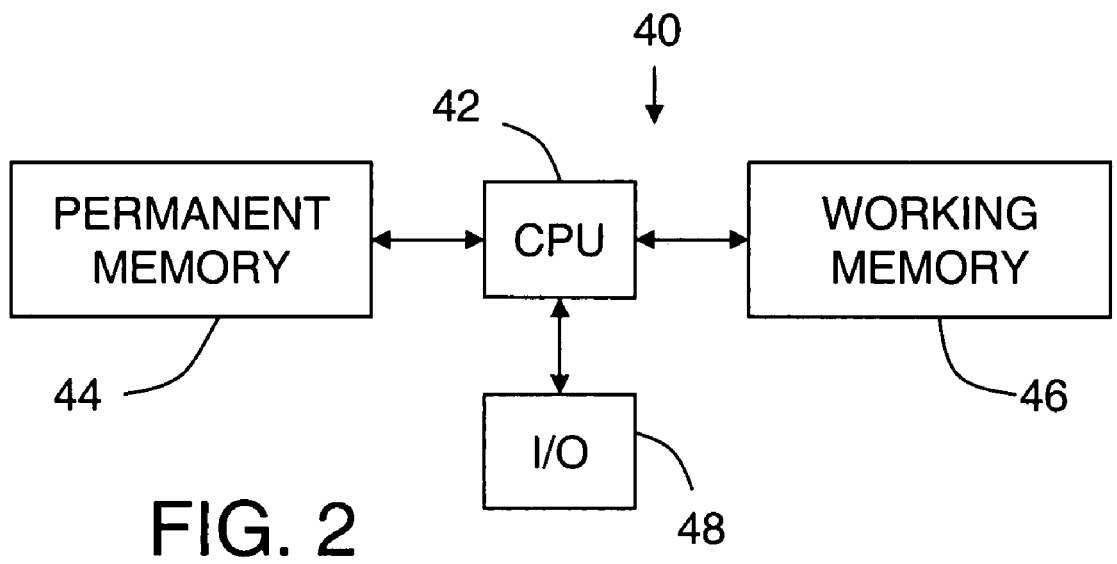
FIG. 2 is a block diagram of a control for use in the apparatus of FIG. 1

Engine 10 is provided with a control 40. Control 40 of this embodiment is a digital computer based control with one or more central processing units devoted to all or individual engine systems (fuel, ignition, exhaust, etc.). A typical control 40, shown in FIG. 2, includes a central processing unit (CPU) 42, permanent memory (ROM) 44 for stored programs, working memory (RAM) 46 for temporary storage, and an input/output block (I/O) 48 for receiving signals from sensors and/or other sources and sending signals to actuators and other receivers. Referring again to FIG. 1, control 40 is responsive to oxygen sensors 22 and 32 and post-catalyst temperature sensors 26 and 36, as well as numerous other sensors required for control of the fuel apparatus 12 and ignition apparatus 14. In addition, it provides control signals to various actuators and/or indicators included in the fuel apparatus 12 and ignition apparatus 14 as required. The permanent memory of control 10 stores the software programs required for fuel and ignition control in all aspects of engine operation, including at a minimum, determining input variables such as engine crankshaft position, engine air flow or throttle position and exhaust gas conditions from the illustrated sensors and other sensors as known in the art. In response, control 10 provides timing and/or quantity control signals to actuators such as fuel injectors, spark ignition generators, a fuel pumps, exhaust gas recirculation valves, and auxiliary throttle actuators (for automatic idle control), etc.

Figure 3:
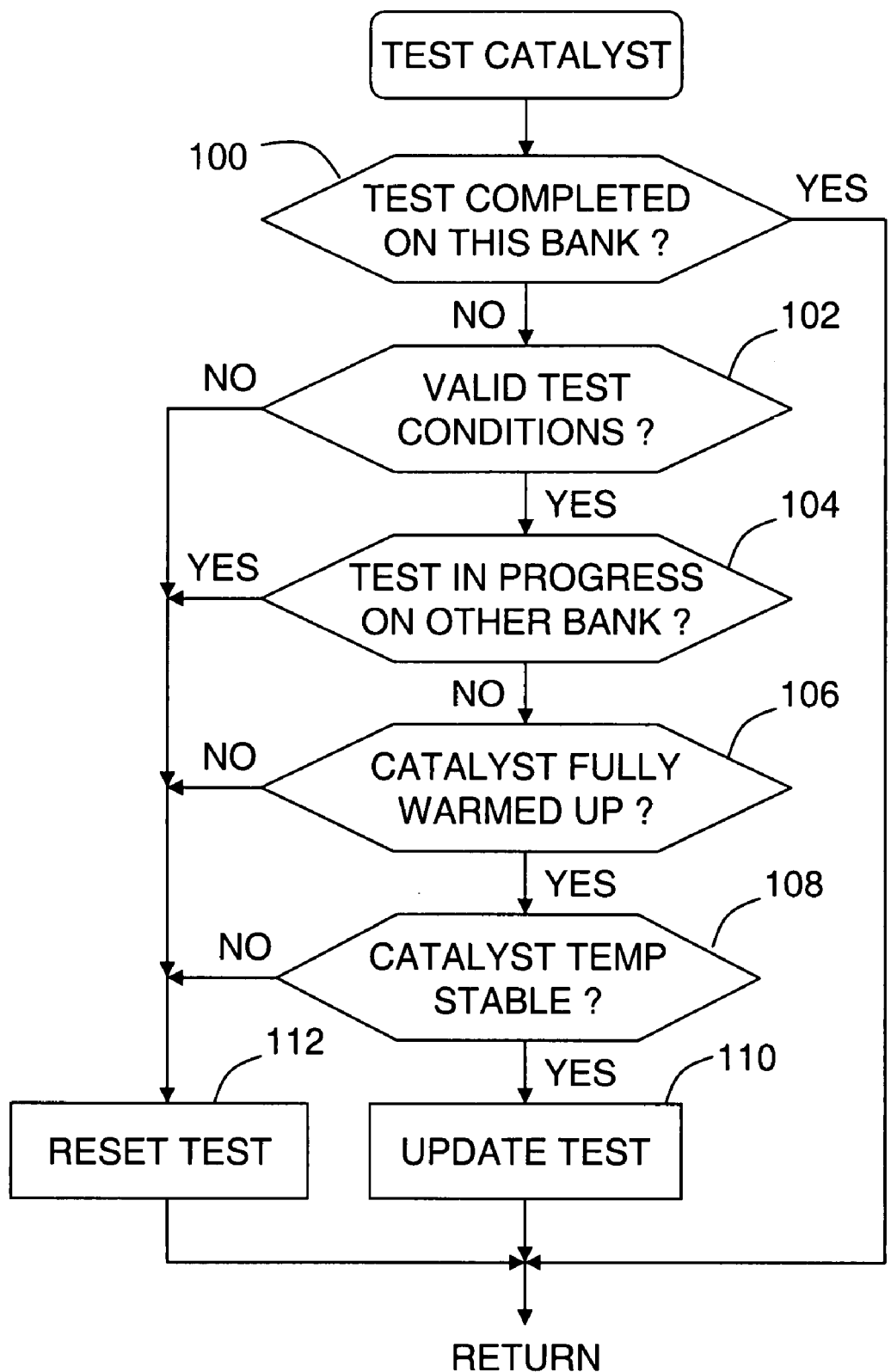

An exemplary software control routine illustrating an embodiment of this invention is described with references to the flow chart FIG. 3, which represents a high level flow chart for a software routine "TEST CATALYST" stored in the permanent memory of control 40. It is run on a time basis, for example as a subroutine of an engine control program. Since it is illustrated for an engine with dual banks of combustion chambers and dual exhaust conduits, as shown in FIG. 1, it is written to prevent simultaneous operation of the invention in both banks at the same time and thus includes some decisions that would not be required for an engine with a single exhaust conduit.

The routine begins at decision point 100 by determining if a test is completed on this bank of combustion chambers (i.e. for this catalytic converter). For purposes of this description, it will be assumed that the relevant bank is that with exhaust conduit 20 (the other bank is that with exhaust conduit 30). If the answer is YES, the rest of the routine is skipped. If the answer is NO, then either (1) this is the potential beginning of a test or (2) a test is in process. In either case, certain test conditions must be satisfied for the test to begin or continue.

The routine thus proceeds to decision point 102 to determine if valid test conditions are present. These test conditions may include any combination of the following, as determined for a particular engine:

(1) No essential sensor or device fault detected;
(2) Engine run-time (from start) is greater than a calibrated reference;
(3) Air temperature is within a calibrated window;
(4) Engine coolant temperature is within a calibrated window;
(5) Time since last deceleration enleanment is greater than a calibrated reference;
(6) Engine speed (RPM) is within a calibrated window;
(7) Engine airflow is within a calibrated window;
(8) The absolute total engine speed change over a calibrated time is less than a calibrated reference;
(9) The absolute value of engine load change over a calibrated time is less than a calibrated reference;
(10) Vehicle speed is within a calibrated window;
(11) Engine knock retard is less than a calibrated reference.

Figure 4:
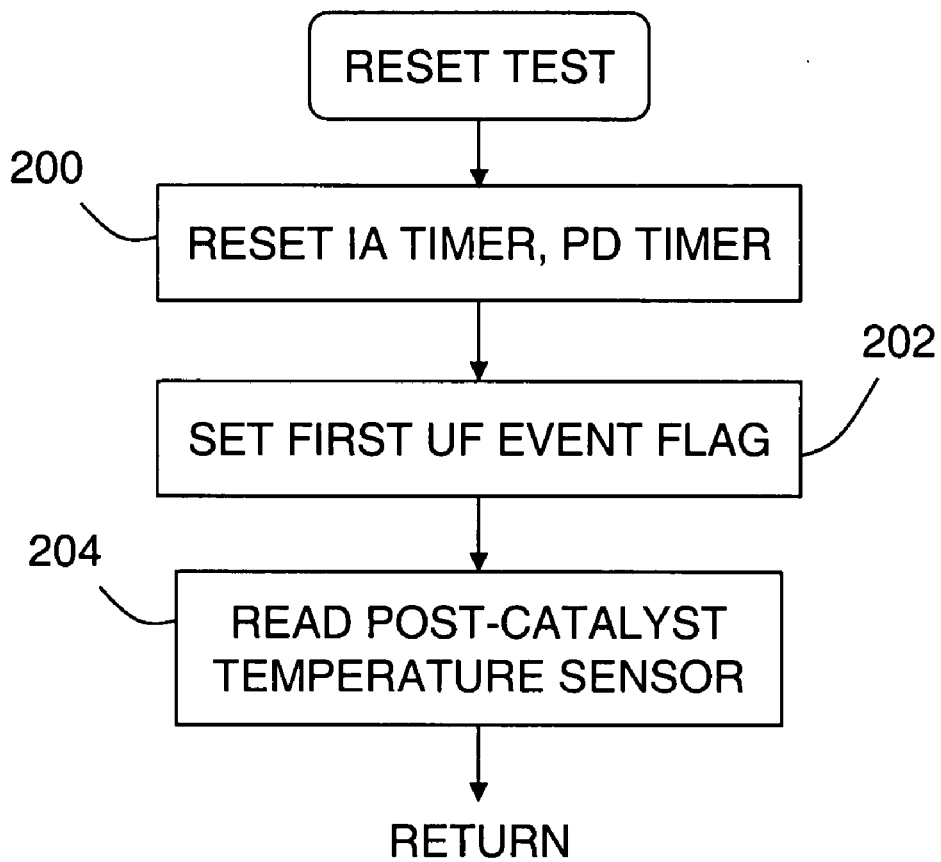
FIG. 3-8 are flow charts describing programming of the control of FIG. 2 to perform the method of this invention in the apparatus of FIG. 1.

If the required valid test conditions are not present, the routine proceeds to step 112 and runs a subroutine RESET TEST, shown in FIG. 4, to reset the routine for the running of the test when conditions permit. This routine resets timers—such as an Intrusive Action (IA) Timer and a Propagation Delay (PD) Timer—in step 200. The functions of these timers will be further described with reference to subroutine UPDATE TEST of FIG. 5. The routine continues to set a FIRST UTF EVENT flag in step 202; and the function of this flag will be described with reference to routine UNBURNED FUEL of FIG. 6. The subroutine then reads the post-catalyst temperature sensor 26 and saves the temperature that is read as the initial catalyst temperature at step 204 before returning for the next cycle of the main routine TEST CATALYST.

If valid test conditions are found at decision point 102, the routine TEST CATALYST proceeds to decision point 104 and determines whether or not a test is in process on the other bank (in this description, the bank with exhaust conduit 30). In an engine with multiple banks and catalytic converters, and particularly if the unburned fuel delivery is provided by inducing misfire in a combustion chamber, it may be desirable to not test the catalysts of both banks simultaneously, since this will double the number of combustion chambers that are misfired and produce a reduction in engine smoothness more easily detectable by a vehicle operator. Thus, if a test is determined to be in progress on the other bank, the routine proceeds from decision point 104 to subroutine 112—RESET TEST—that has already been described. Of course, decision point 104 may be eliminated for a single bank system in which only one catalytic converter requires testing. It may also be eliminated in the case of an engine using direct injection, as will be described at a later point.

If there is no test in progress on another bank, routine TEST CATALYST proceeds from decision point 104 to decision point 106 and determines if the catalyst is fully warmed up. This may be accomplished by comparing the most recently stored value of the temperature read from post-catalyst temperature sensor 26 to a predetermined reference value. If the answer is yes, the routine proceeds to decision point 108 and determines if the catalyst temperature is stable, which may be accomplished by any known method of stability determination using the most recent and one or more previous stored values of the temperature read from post-catalyst temperature sensor 26. A simple method is to compare the most recently stored value to the previously stored value; but mathematical variations of such a test are well know in the art. Since the catalyst test performed by this invention is based on measuring a temperature change produced by catalyst self-heating, the best accuracy is obtained if the catalyst temperature is otherwise stable during the test; and the catalyst temperature is unlikely to be stable if the catalyst is not yet fully warmed up. In this embodiment, both tests (106 and 108) are used for the greatest reliability; although it may be that only one will be required in a particular case. If the answer to either of the tests in decision points 106 and 108 is NO, the program calls subroutine RESET TEST and proceeds as previously described. But if the answer to both of the tests in decision points 106 and 108 is YES, routine TEST CATALYST calls subroutine UPDATE TEST at step 110.

Figure 5:
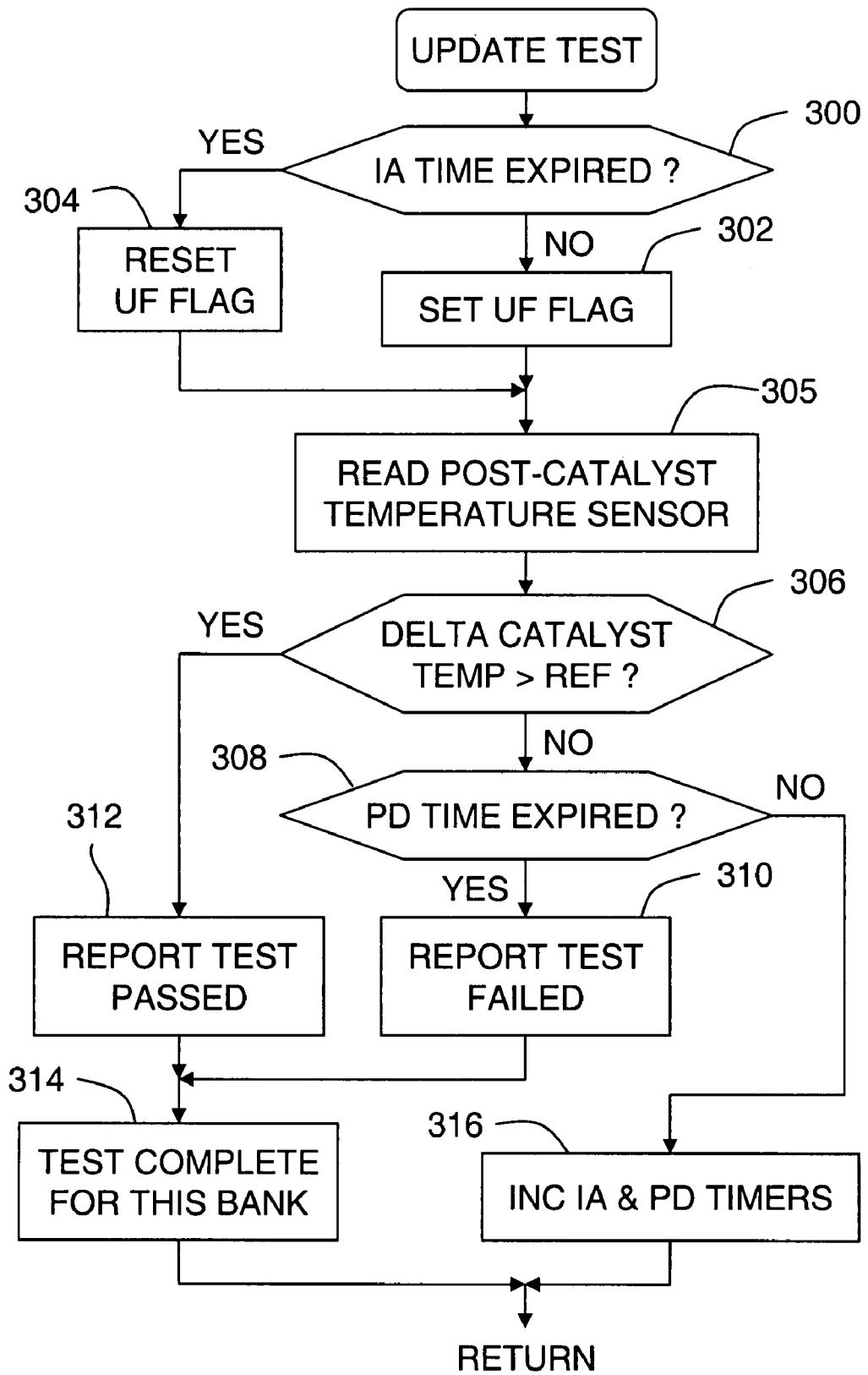

Subroutine UPDATE TEST is described with reference to FIG. 5. The subroutine begins at decision point 300 by determining if the Intrusive Action (IA) Timer has timed out. The IA timer controls the total time during which normal engine operation is modified to provide a quantity of unburned fuel to at least one combustion chamber for delivery to exhaust conduit 20, and thus to catalytic converter 26. Clearly, on the first run of subroutine UPDATE TEST after a run of RESET test, this timer will be in a reset state; and the answer will be NO. The subroutine will thus proceed to step 302 in which a UF FLAG is set. The name "UF" refers to unburned fuel; and it is a control flag for use by an event based software routine that controls the provision of unburned fuel to the catalyst. Subsequent cycles of subroutine UPDATE TEST will repeat this path until the time controlled by IA timer of decision point 300 has expired; and from that time forward the subroutine path will be from decision point 300 to step 304, in which the UF FLAG is reset. Thus, this first part of subroutine UPDATE TEST provides a flag signal to routine UNBURNED FUEL to make the next fuel event of a predetermine combustion chamber an unburned fuel event by providing unburned fuel to the combustion chamber for delivery to catalytic converter 26.

Subroutine UPDATE TEST continues from either of steps 302 and 304 to decision point 305, which is the beginning of a second portion of the subroutine in which the catalyst temperature increase (if any) from the provision of unburned fuel is tested and a decision made as to whether or not the catalyst is operational. At decision point 305, the present catalyst temperature is read from post-catalyst temperature sensor 26. Next, at step 306, this present catalyst temperature is compared with the initial catalyst temperature stored in step 204 of subroutine RESET TEST; and the difference therebetween—a quantity DELTA CATALYST TEMP—is compared with a calibrated reference temperature. If DELTA CATALYST TEMP does not exceed the reference, the subroutine proceeds to decision point 308 and determines if a calibrated PD TIME has expired. PD TIME is the total test time allowed for the heating of the catalyst in response to the provision of unburned fuel from a combustion chamber, taking into account a propagation delay time and allowed heating time within the converter. If the PD TIME has not yet expired at decision point 308 during this cycle, the subroutine proceeds to step 316 and increments the IA and PD timers before returning. But if the PD TIME has expired at step 308 after DELTA CATALYST TEMPERATURE is found to not yet exceed the reference at decision point 308 within the PD TIME, then the provision of unburned fuel to the catalyst did not produce the required temperature rise within the allowed PD time; and the catalyst is declared to be non-operational with a TEST FAILED report at step 310.

Returning to decision point 306, if DELTA CATALYST TEMPERATURE is found to exceed the reference at decision point 308, the catalyst is found to be operational; and the subroutine proceeds to report TEST PASSED at step 312. Thus, if DELTA CATALYST TEMP is found to exceed the temperature reference REF at any time prior to expiration of the PD timer, the catalyst is found to be operational. From either of steps 310 or 312, the subroutine proceeds to step 314 and reports the test complete for this bank before returning.

Figure 6:
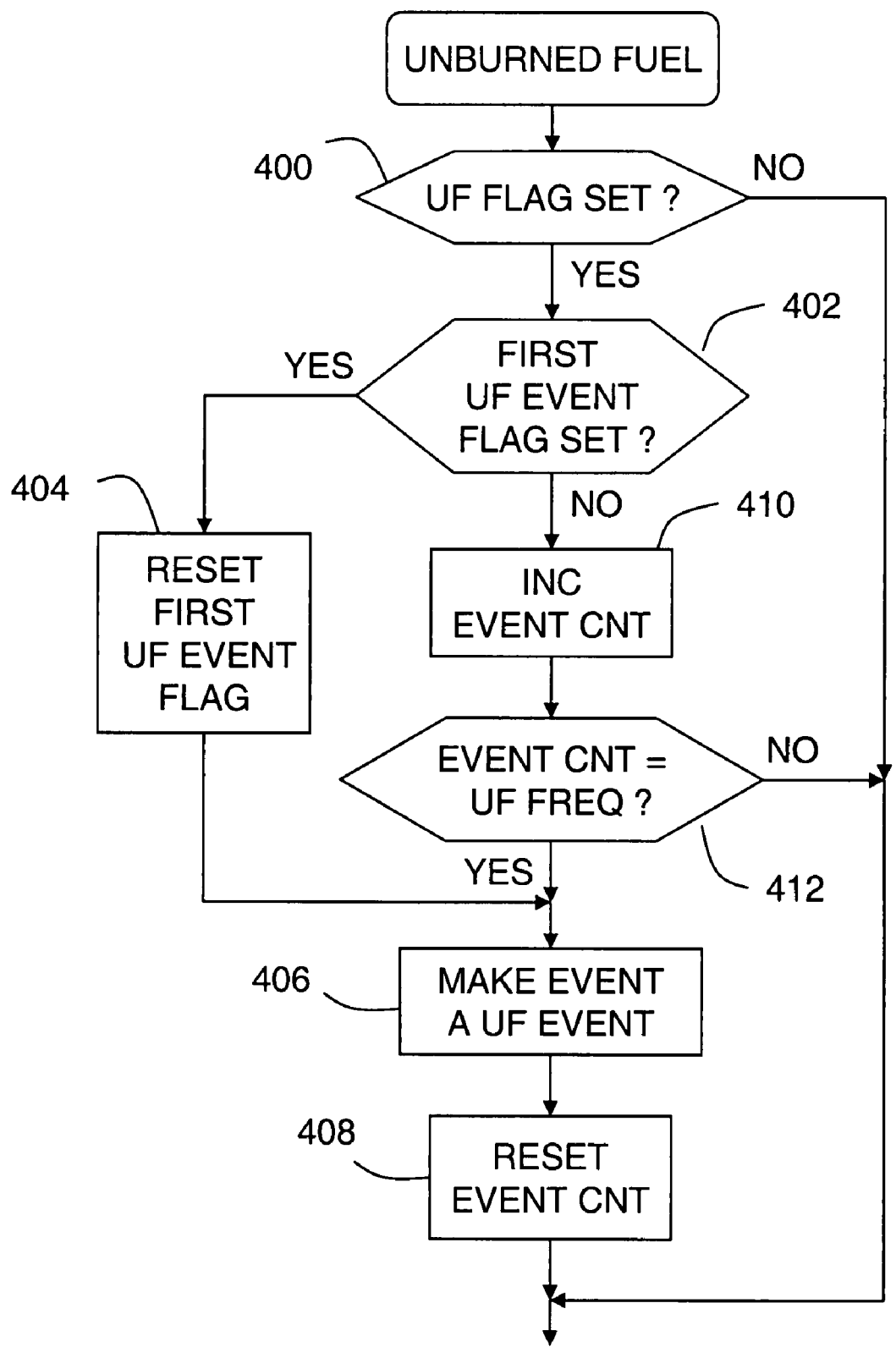

Routine UNBURNED FUEL, described with reference to FIG. 6, is an event based routine that determines whether or not unburned fuel will be provided through a predetermined combustion chamber of engine 10 during each combustion chamber fueling event. If more than one combustion chamber is used in a bank, there will be a separate copy of routine UNBURNED FUEL for each. As shown, it is not a subroutine of routine TEST CATALYST and is thus time independent thereof. Communication is provided from routine TEST CATALYST to routine UNBURNED FUEL through the UF FLAG, which is controlled by subroutine UPDATE TEST of routine TEST CATALYST, and the FIRST UF EVENT FLAG, which is set by subroutine RESET TEST of routine TEST CATALYST.

In this document, an "event" is a fueling event of a combustion chamber of engine 10. In normal operation, the fuel provided during the fueling event is ignited, and the fueling event becomes a combustion event, but this invention operates by withholding or avoiding ignition of the fuel to provide this fuel to the catalytic converter from the combustion chamber via the exhaust conduit and thus produce an unburned fuel event. In the case of an engine with spark ignition in which a fuel charge is provided through the intake valve of a combustion chamber, the method and apparatus of this invention may make the event an unburned fuel event by withholding the spark ignition from the event to produce a misfire. In the case of an engine with direct injection into the combustion chamber, the method and apparatus of this invention may make the event an unburned fuel event by injecting fuel during the exhaust portion of the normal combustion process, with the fuel so injected being pumped out of the combustion chamber without being ignited, whether or not fuel was ignited in the combustion chamber prior to the exhaust portion. Routine UNBURNED FUEL as shown permits periodic selection of events as unburned fuel events over a period of time so as to reduce variations in engine speed and power that might be discernible by an occupant of the vehicle powered by engine 10. Thus, for example, during the Intrusive Action (IA) period, every twentieth (20$^{th}$) event of a predetermined combustion chamber might be made an unburned fuel event.

Routine UBURNED FUEL begins at step 400 by determining if the UF FLAG is set. If the answer is NO, then the rest of the routine is skipped and the routine ends. If the answer is yes, then the routine checks the FIRST UF EVENT FLAG at decision point 402. This flag, if set, provides for an initial unburned fuel event to be performed. Thus, if the FIRST UF EVENT FLAG is set at decision point 402, the routine proceeds to reset the FIRST UF EVENT FLAG at step 404, make the next fueling event of the chosen combustion chamber an unburned fuel event at step 406 and reset an event counter EVENT CNT at step 408 before returning. Beginning the next cycle of the routine with the UF FLAG still set at decision point 400 and the FIRST UF EVENT FLAG not set at decision point 402, the event counter EVENT CNT is incremented at step 410. The event counter EVENT CNT is then compared with a calibrated reference UF FREQ at step 412. Reference UF FREQ is a reference count determining the number of events between unburned fuel events after the initial unburned fuel event and thus the frequency with which fuelling events are made unburned fuel events. For example, if every twentieth event is to be an unburned fuel event, UF FREQ may be calibrated as 20 incremental steps from its reset value. If the result of the comparison at decision point 412 is that EVENT CNT is not equal to UF FREQ, the subroutine returns without making the next event an unburned fuel event; but if EVENT CNT is found to be equal to UF FREQ, the subroutine proceeds to step 406 to make the event an unburned fuel event and then to step 408 to reset EVENT CNT. By means of routine UNBURNED FUEL, fuelling events are made unburned fuel events at a frequency controlled by reference UF FREQ as long as the UF flag is set.

Figure 7:
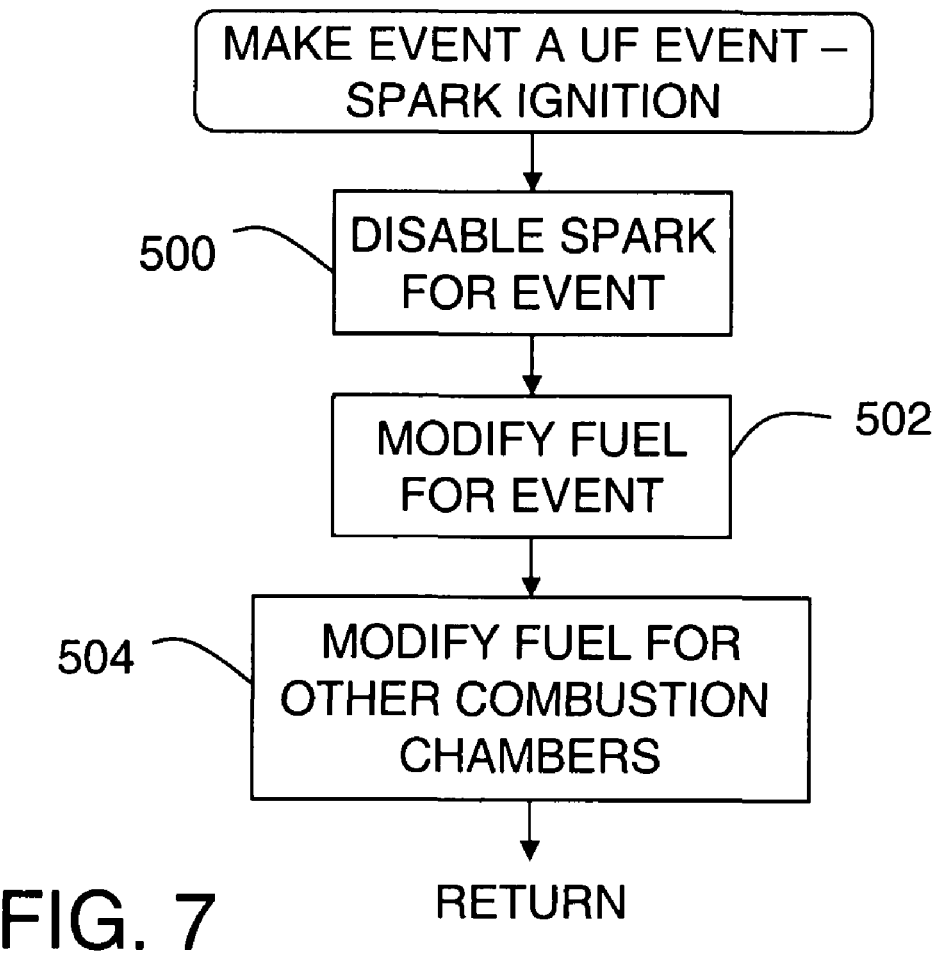

Step 406—MAKE EVENT A UF EVENT—of FIG. 6 is where the action is taken to provide unburned fuel through a combustion chamber of engine 10 to catalytic converter 24, wherein the fuel interacts with an operational catalyst to create heat and raise the temperature measured by post-catalyst temperature sensor 26. Two embodiments of this step are described, each having primary application to a different manner of fuel delivery to the combustion chamber. In FIG. 7, subroutine MAKE EVENT A UF EVENT—SPARK IGNITION—is useful where fuel is mixed with air prior to entry into the combustion chamber and ignited by a spark at a predetermined crankshaft position. The steps of this subroutine supplement and/or modify the standard fuel and ignition subroutines and may be incorporated therein. Although shown together for convenience, the individual steps would most likely be incorporated into different parts of the standard fuel and ignition subroutines at places appropriate to accomplish their purposes. In step 500 the spark ignition is disabled for the event, so that the fuel will pass unburned through the combustion chamber to catalytic converter 24 via exhaust conduit 20. This essentially constitutes a control-induced misfire. In one preferred embodiment, the unburned fuel events are permitted only during periods of engine idle operation, as defined by the VALID TEST CONDITIONS of decision point 102 in FIG. 3. Not only is does a fully warmed up idle condition stabilize other engine operating and catalyst temperature conditions, but the automatic idle control systems commonly provided for vehicle engines helps reduce engine speed variations due to the induced misfires. In step 502 the quantity of fuel provided for the event is modified, to the extent required, from that called for by the fuel control system for combustion to a quantity calibrated for the catalyst test. Since the test is typically run only during carefully controlled conditions, as previously described, this may be accomplished by applying a calibrated factor to the quantity that would have been provided in a normal combustion event. At step 504, fuel for selected close time-related events in predetermined other combustion chambers may be adjusted in a coordinated manner to help maintain a constant engine speed and reduce any apparent engine roughness caused by the induced misfire. One example of such adjustment is to increase the fuel slightly in other combustion chambers for events immediately preceding or following the UF event in the normal firing order of engine 10.

Figure 8:
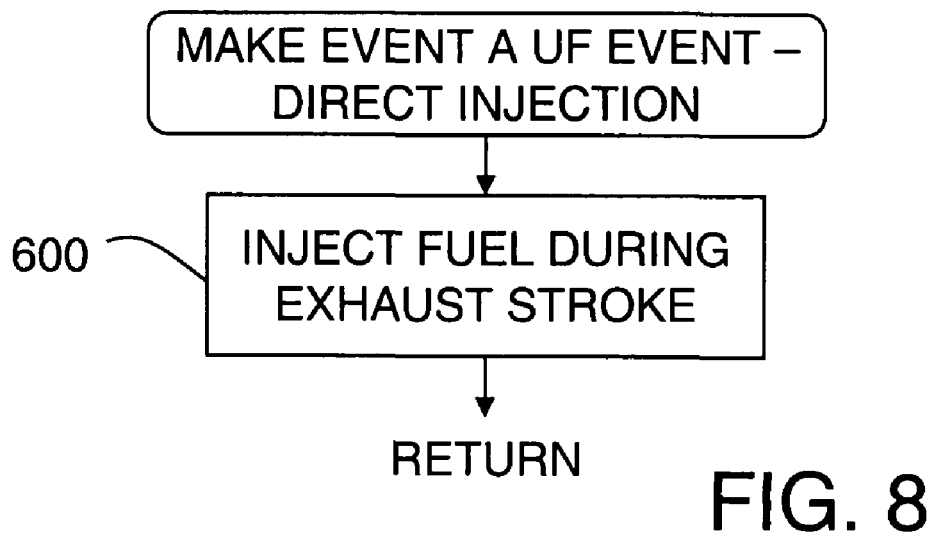

An alternative embodiment is the subroutine MAKE EVENT A UF EVENT—DIRECT INJECTION, which is described with reference to the flow chart of FIG. 8. This embodiment is used with engines in which the fuel is injected directly into the combustion chamber. Referring to step 600, a calibrated quantity of fuel is injected during the exhaust stroke of the affected combustion chamber, where the exhaust stroke is defined as that portion of the normal cylinder cycle after the normal combustion time but while the exhaust valve is open. Since the fuel enters the combustion chamber after the normal combustion event while the exhaust valve is open, it is not ignited. It passes through the combustion chamber unburned and joins the normal combustion products, if any, flowing to catalytic converter 24 via exhaust conduit 20. Thus, this embodiment of the invention can be used in either spark ignited or diesel engines and does not require an induced misfire of the fuel normally ignited in the combustion chamber. When used as an additional injection following the normal injection and combustion in the combustion chamber, adjustment of fuel to other combustion chambers will typically not be required, although the invention does not preclude it.

When the test has been completed on the bank of engine 10 including exhaust conduit 20 and catalytic converter 24, then it may be performed on the other bank including exhaust conduit 30 and catalytic converter 34. The test is generally performed on each bank of combustion chambers once during each ignition cycle, wherein an ignition cycle is defined as the period of engine operation following an engine start-up (usually by an ignition key of some sort) until engine operation is stopped.

The invention claimed is:

1. A method of sensing and signalling a non-operational status of a catalyst in a catalytic converter in an exhaust conduit of a combustion engine, the engine having a fuel charge supply apparatus providing a fuel charge to combustion chambers of the engine with a predetermined air/fuel ratio in response to a pre-catalyst oxygen sensor in the exhaust conduit, the method comprising the steps:

providing a post-catalyst temperature sensor in the exhaust conduit;

reading the post-catalyst temperature sensor to provide an initial sampled exhaust gas temperature;

providing a quantity of unburned fuel through at least one of the combustion chambers to the catalytic converter during an idle period of engine operation while temporarily suspending a response of the fuel charge apparatus to the pre-catalyst oxygen sensor;

monitoring the post-catalyst temperature sensor at a predetermined propagation delay time after providing the quantity of unburned fuel to provide an additional sampled exhaust gas temperature;

comparing a temperature difference between the additional sampled exhaust gas temperature and the initial sampled exhaust gas temperature with a predetermined reference value; and signalling a non-operational status of the catalyst if the temperature difference does not exceed the predetermined reference value.

2. The method of claim 1 wherein the step of providing a quantity of unburned fuel through at least one of the combustion chambers is repeated for selected events in the at least one of the combustion chambers for a predetermined intrusive action time, wherein a frequency of the selected events is determined by an event counter.

3. The method of claim 1 wherein the engine has a plurality of banks of combustion chambers each with its own exhaust conduit, catalytic converter and post-catalyst temperature sensor and the method prevents its own operation on more than one of the banks simultaneously.

4. The method of claim 1 further comprising the step of determining that the post-catalyst temperature sensor is indicative of a stable catalyst temperature prior to the step of reading the post-catalyst temperature sensor to provide an initial sampled exhaust gas temperature.

5. The method of claim 1 further comprising the step of determining that the post-catalyst temperature sensor is indicative of a fully warmed up catalyst temperature prior to the step of reading the post-catalyst temperature sensor to provide an initial sampled exhaust gas temperature.

6. The method of claim 1 wherein the combustion engine includes spark ignition apparatus for igniting the fuel charges within the combustion chambers and the step of providing a quantity of unburned fuel through at least one of the combustion chambers comprises withholding spark ignition from the at least one of the combustion chambers to cause a misfire therein.

7. The method of claim 6 wherein the quantity of fuel in the fuel charge provided to the at least one of the combustion chambers when the spark ignition is withheld is greater than the quantity of fuel that would have been provided in the fuel charge if the spark ignition had not been withheld.

8. The method of claim 1 wherein the combustion engine provides direct injection of fuel into the combustion chambers and the step of providing a quantity of unburned fuel from at least one of the combustion chambers comprises injecting the quantity of unburned fuel into the at least one of the combustion chambers during an exhaust cycle thereof, whereby the quantity of unburned fuel reaches the catalytic converter in an unburned state.

9. The method of claim 8 wherein the quantity of unburned fuel is added to combustion products of a combustion event within the at least one of the combustion chambers during the exhaust of those combustion products therefrom.

10. A catalyst operational state monitoring system for use with a combustion engine having an exhaust conduit with a catalytic converter and further having a fuel charge supply apparatus providing a fuel charge to the combustion chambers with a predetermined air/fuel ratio in response to a pre-catalyst oxygen sensor in the exhaust conduit, the monitoring system comprising:

a post-catalyst temperature sensor in the exhaust conduit; and a digital processor adapted to:

read the post-catalyst temperature sensor to provide an initial sampled exhaust gas temperature, provide a quantity of unburned fuel through at least one of the combustion chambers to the catalytic converter during an idle period of engine operation while temporarily suspending a response of the fuel charge apparatus to the pre-catalyst oxygen sensor, monitor the post-catalyst temperature sensor at a predetermined time after providing the quantity of unburned fuel to provide an additional sampled exhaust gas temperature, compare a temperature difference between the additional sampled exhaust gas temperatures and the initial sampled exhaust gas temperature with a predetermined reference value, and signal a non-operational status of the catalyst if the temperature difference does not exceed the predetermined reference value.

11. The catalyst operational state monitoring system of claim 10 further comprising a digital processor adapted to determine that the post-catalyst temperature sensor is indicative of a stable catalyst temperature prior to reading the post-catalyst temperature sensor to provide an initial sampled exhaust gas temperature.

12. The catalyst operational state monitoring system of claim 10 further comprising a digital processor adapted to determine that the post-catalyst temperature sensor is indicative of a fully warmed up catalyst temperature prior to reading the post-catalyst temperature sensor to provide an initial sampled exhaust gas temperature.

* * * * *